(12) United States Patent  (10) Patent No.: US 8,729,889 B2
Ghislanzoni  (45) Date of Patent: May 20, 2014

(54) METHOD AND APPARATUS FOR MAGNETIC CONTACTLESS MEASUREMENT OF ANGULAR AND LINEAR POSITIONS

(75) Inventor: Luca Ghislanzoni, Lecco (IT)

(73) Assignee: C-Sigma s.r.l., Lecco (IT)

( * ) Notice: Subject to any disclaimer, the term of this patent is extended or adjusted under 35 U.S.C. 154(b) by 891 days.

(21) Appl. No.: 12/812,761

(22) PCT Filed: Jan. 17, 2009

(86) PCT No.: PCT/IB2009/050167
§ 371 (c)(1),
(2), (4) Date: Jul. 14, 2010

(87) PCT Pub. No.: WO2009/090620
PCT Pub. Date: Jul. 23, 2009

(65) Prior Publication Data
US 2010/0308804 A1  Dec. 9, 2010

(30) Foreign Application Priority Data
Jan. 18, 2008  (IT) ............................. LC2008A0001

(51) Int. Cl.
*G01B 7/14*  (2006.01)
(52) U.S. Cl.
USPC .............. 324/207.23; 324/207.2; 324/207.24

(58) Field of Classification Search
USPC ............................ 324/207.2, 207.24, 207.23
See application file for complete search history.

(56) References Cited

U.S. PATENT DOCUMENTS 6,556,005 B1 * 4/2003 Oomkes ..................... 324/207.2
2004/0217758 A1 * 11/2004 Leonard .................... 324/207.2

* cited by examiner

*Primary Examiner* — Arleen M Vazquez
*Assistant Examiner* — Alesa Allgood

(57) ABSTRACT

Contactless measurement of angular or linear positions is obtained by means of magnetic circuit configurations, biased by a permanent magnet, characterized by two airgaps whose relative geometry is designed to result in magnetic field values whose ratio is a function of the position to be measured. The magnetic field in said airgaps is measured by magnetic field probes, whose output signals are then electronically conditioned to generate a voltage proportional to said ratio. The output signal being function of a ratio, it naturally becomes insensitive to drifts of the magnet working point, or drifts in sensitivity of the magnetic field probes. In one embodiment said ratio of magnetic field values becomes a function of the relative angular displacement of two coaxial shafts, while becoming completely independent from their absolute angular displacement, allowing hence the realization of simple and robust torque sensors.

20 Claims, 5 Drawing Sheets

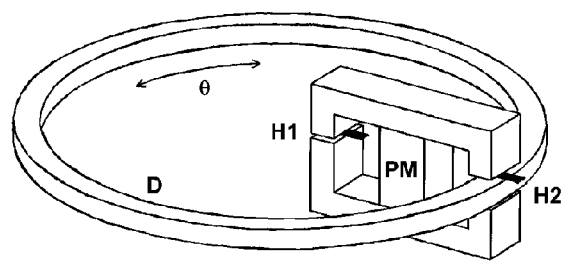
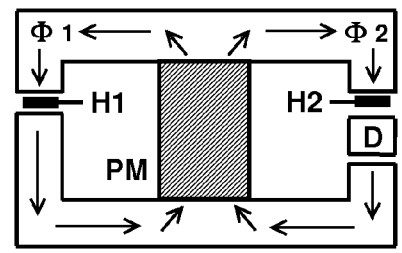
Fig. 1a　　　　　　　　　　　Fig. 1b
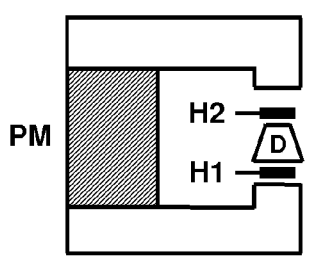
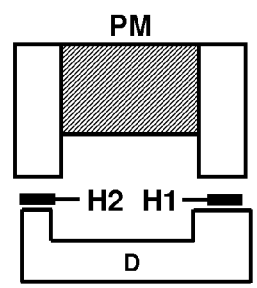
Fig. 1c　　　　　　　　　　　Fig. 1d
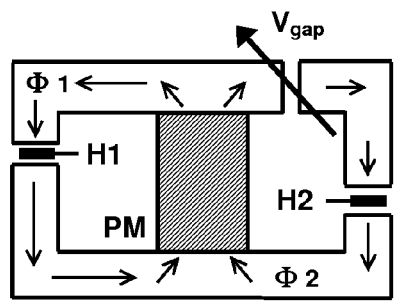
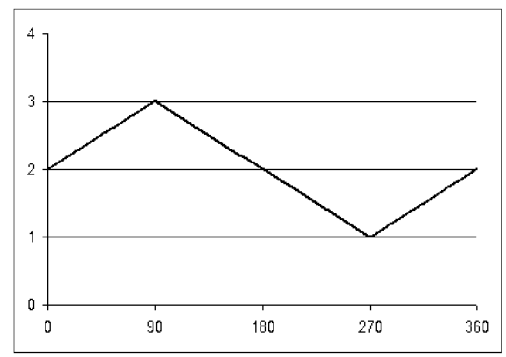
Fig. 1e　　　　　　　　　　　Fig. 1f

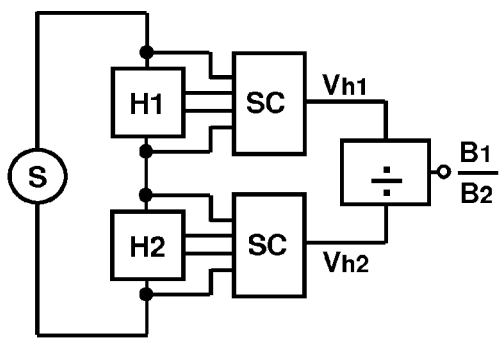
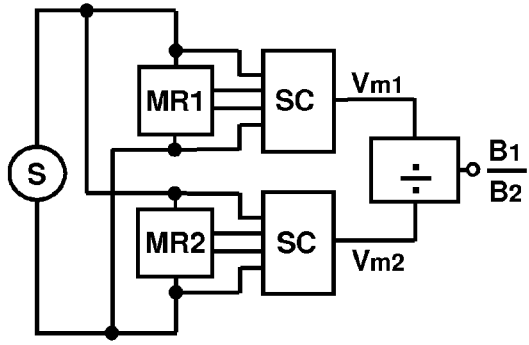
Fig. 3a
Fig. 3b
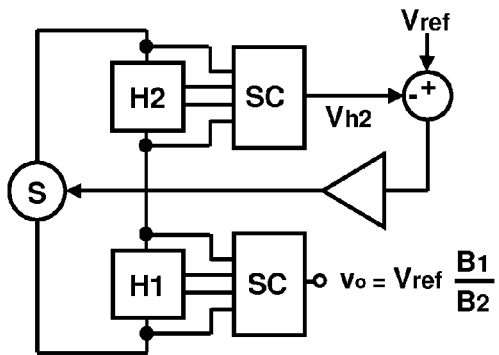
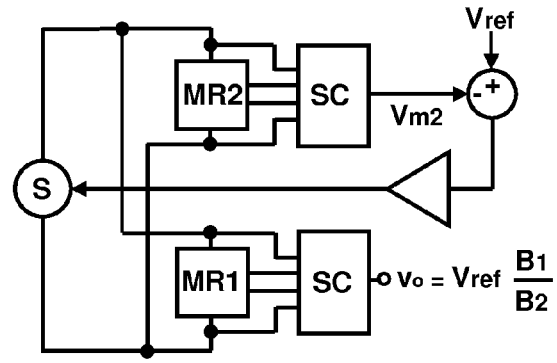
Fig. 3c
Fig. 3d
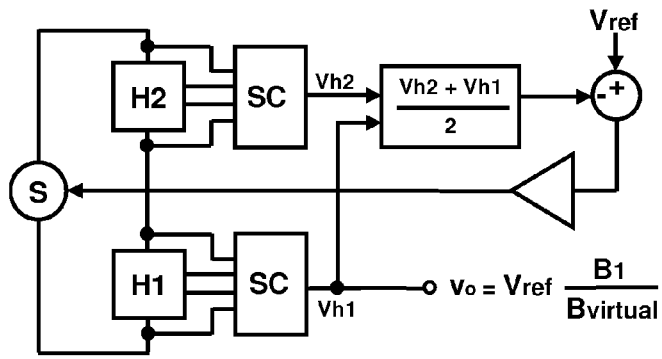
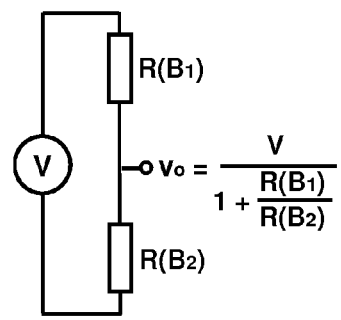
Fig. 3e
Fig. 3f

METHOD AND APPARATUS FOR MAGNETIC CONTACTLESS MEASUREMENT OF ANGULAR AND LINEAR POSITIONS

FIELD OF THE INVENTION

This invention describes a method, and various apparatuses implementing said method, for the contactless measurement of angular and linear positions by means of magnetic fields.

BACKGROUND OF THE INVENTION

Several devices are commercially available which already feature similar functions, although obtained by other means. A typical approach would consist in placing a magnetic field sensor in an airgap whose geometry changes as a function of the angular or linear displacement to be measured. Said change of geometry is arranged as to result in a corresponding change in the value of the magnetic field, B, as measured by said magnetic field sensor.

The change in the B field value can be obtained by either varying the length of the airgap, or its cross-section, or both, as a function of the displacement in position. The straight implementation of such basic approaches is rather obvious, being just a matter to devise magnetic circuit configurations such that the value of B is a direct function of the relative position of the composing parts. The simplest and most robust way to generate the required magnetic field would then make use of permanent magnets. Unfortunately things are not that straightforward, as the working point of low cost permanent magnets (PMs) is heavily affected by temperature, by naturally occurring demagnetization effects, and variations in magnetic circuit's total reluctance. To counteract the inaccuracies inherent to said trivial implementations, more sophisticated techniques have been developed, as disclosed in numerous patents.

In particular, EP 0 768 541 A1 (referred to as D1), "Capteur Magnétique de Position", SAGEM SA, 01.10.1997, discloses a magnetic circuit configuration arranged as to generate two magnetic fields, B1 in airgap 1, and B2 in airgap 2, each one of which is a linear function of position, and whose sum is a constant value. The position is then measured by computing the value of the relative differential measurement (B1−B2)/(B1+B2), greatly reducing sensitivity to variations in temperature.

For magnetic type of contactless position measurements an additional source of inaccuracy are external stray fields, it is hence important to try to minimise their relative importance. U.S. Pat. No. 5,789,917 A1 (referred to as D2), "Magnetic Position Sensor with Hall Probe Formed in an Air Gap of a Stator", Moving Magnet Technologies SA, Aug. 4, 1998, discloses a magnetic circuit configuration arranged as to effectively screen from external fields.

For the measurement of the value of the magnetic field, both D1 and D2 make use of Hall effect probes. Hall effect probes generate an output voltage, Vh (Volts), proportional to the value of the biasing current, Ib (Amperes), and to the magnetic field, B (Tesla), through the factor of proportionality, Kh (sensitivity, with units V/AT):

$$Vh = Kh * Ib * B \quad (1)$$

BRIEF DESCRIPTION OF THE DRAWINGS

FIG. 1a depicts a schematic representation of an example of magnetic circuit parallel configuration.

FIG. 1b is a relevant cross section of the magnetic circuit of FIG. 1a.

FIG. 1c depicts a schematic representation of an example of magnetic circuit series configuration.

FIG. 1d depicts a further example of magnetic circuit series configuration.

FIG. 1e depicts a schematic representation of an example of magnetic circuit parallel configuration, whereby one of the two parallel branches features a variable reluctance airgap.

FIG. 1f is an example of output signal featuring a symmetrical triangle shape.

FIG. 2b presents a diagrammatic view of a cross-section of the embodiment of FIG. 2a.

FIG. 3a presents a schematic diagram of a signal processing chain suitable for Hall effect probes.

FIG. 3b presents a schematic diagram of a signal processing chain suitable for magnetoresistive bridge type of sensors.

FIGS. 3c and 3d present a signal processing chain solution for the calculation of the B1/B2 ratio.

FIG. 3e presents a signal processing chain solution for the Virtual Reference Airgap approach.

FIG. 3f presents a magnetoresistive voltage divider approach for calculating the B1/B2 ratio.

DESCRIPTION

Figure 2A:
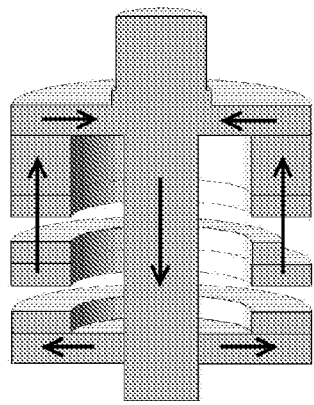
FIG. 2a presents a sectioned perspective view of a rotary magnetic circuit embodiment.

The method and apparatuses described in the following description make use of Hall probes for the measurement of B field values, however, the use of magnetoresitive type of sensors is also possible. Most commercially available magnetoresitive sensors are of the Wheatstone bridge type, generating an output voltage, Vm (mVolts), proportional to the value of the biasing voltage, Vb (Volts), and of the magnetic field, B (Tesla), through the factor of proportionality, Km (sensitivity, with units (mV/V)/(kA/m)):

$$Vm=Km*Vb*B \quad (2)$$

It shall be remarked that at the present state of the art most commercially available magnetoresitive bridge sensors are optimised for the measurement of relatively low B field values (few tens of mT), whereas Hall effect probes are better at the measurement of higher B field values (few hundreds mT). As the magnetic circuit configurations herewith described can easily achieve airgap B field values of few hundreds mT, and hence decreasing the relative importance of inaccuracies introduced by external stray fields, preference will be given to the use of Hall effect probes. In case it might turn out that for some applications also magnetorestive sensors becomes interesting, or that suitable magnetoresistive sensors might become commercially available, those skilled in the art can then easily imagine obvious way to replace said Hall probes with said magnetoresistive sensors.

Differently from the method disclosed in D1, which is based on the differential relative measurement (B1−B2)/(B1+B2), the method and apparatuses detailed in the following description make use of magnetic circuit configurations arranged in ways that the measurement of position corresponds to the simple ratio, B1/B2, between the B field values measured by two separate sensors, located in two separate airgaps. If said B1/B2 ratio is furthermore made dependent on geometric relationships only, then drifts of the PM's working point would automatically cancel out (appearing both at numerator and denominator). To achieve this result two basic magnetic circuit configurations are possible: parallel configuration, series configuration.

FIG. 1a schematically depicts an example of parallel configuration, and whose relevant cross-section is displayed in FIG. 1b.

It can be readily verified that said F the PM's Magnetomotive Force at any particular working point, the two parallel branches will experience magnetic fluxes φ1 and φ2, defined respectively by φ1=F/R1 and φ2=F/R2, where R1 and R2 are the respective reluctances (largely dominated by the length of the respective airgaps). Considering that B=φ/S, the voltage values generated by the Hall probes H1 and H2 are respectively:

$$Vh1=Kh1*Ib*F/(R1*S1) \; Vh2=Kh2*Ib*F/(R2*S2) \quad (3)$$

where S1 and S2 are the effective areas (effective areas are computed taking into account also border effects) of the airgap cross-sections coplanar with the respective Hall probes. If both Hall sensors are serially supplied with the same biasing current Ib (or magnetoresitive bridges are parallel supplied by the same biasing voltage Vb), by taking the ratio between the two Hall voltages, we finally have:

$$Vh1/Vh2=Kh1/Kh2*B1/B2=Kh1/Kh2*R2/R1*S2/S1 \quad (4)$$

i.e.: a value which is completely independent from the value of the Magnetomotive Force F corresponding to that particular working point. It shall be noted that Kh1/Kh2 is explicitly maintained in the above expression, as Hall effect sensors of the same type (such as for example the KSY14 from Infineon) might differ in their sensitivity value. Hence, allowance for individual calibrations shall be foreseen, for example to be carried out during manufacturing by adjusting the gain of a pre-amplifier, or by means of simple resistive networks selected on test.

Furthermore, dependence from sensitivity through the ratio Kh1/Kh2 implies that a large part of the dependence on temperature of the sensitivity is also inherently compensated, the ratio of the two sensitivities being much less dependent on temperature than each of the sensitivities taken individually. The same considerations apply to any long-term effect resulting in degradation of sensitivity with time, such as for example total radiation dose, aging effects, and the like, provided that H1 and H2 are sensors of the same type (generally, sensors of the same type degrade the same way). Therefore, by choosing the same type of sensor for both H1 and H2, the ratio Kh1/Kh2 can be approximated by a constant value, const, largely independent from temperature and degradation effects, and equal to 1 for the ideal case Kh1=Kh2 corresponding to matched sensors, hence:

$$Vh1/Vh2=const*B1/B2=const*R2S2/R1S1 \quad (5)$$

Making it explicit that the measurement of position, obtained by computing the ratio Vh1/Vh2, is a function of geometric relationships only, as represented by the ratio R2 S2/R1 S1.

In FIG. 1a, D is a ring of ferromagnetic material, whose thickness varies along its circumference. In this way, by rotating the ring relatively to the magnetic circuit, the total length of airgap 2 will vary, and consequently also the value of R2, as a function of the angle of rotation θ. The cross-section example depicted in FIG. 1b schematically represents the equivalent magnetic circuit when ring D is rotated to an angular position corresponding to its maximum thickness being located in airgap 2. By suitably machining said ring D (carefully taking into account also the so called "border effects") it is then possible to obtain an output signal Vh1/Vh2, which is a function of the rotation angle θ. The present invention is not concerned with the particular shape of ring D, as several different shapes may exist, but that all yield the same form for the output function. Let us take the example of an application for which a triangle output signal is required, the corresponding R2 S2/R1 S1 ratio can be obtained in several different ways:

a) by holding constant the geometry of airgap 1, so that the product R1 S1 is also constant, and by linearly increasing the thickness of ring D between 0 and 180°, while its width is held constant, to then linearly decrease it between 180° and 360° (of course, introducing corrections to compensate for border effects), the product R2 S2 will be a linear function of θ;

b) as above, but holding constant the thickness of the ring, to then vary its width;

c) any suitable combination of a) and b)

d) it is also possible to add a second ring, concentric to the first one and passing through airgap 1, so that now the ratio R2 S2/R1 S1 can be modulated by varying the geometry of both airgap 1 and airgap 2 at the same time, as to obtain the desired triangle form for the output function.

The cross-section schematically represented in FIG. 1c represents instead an example of series configuration, whereby both airgaps see the same magnetic flux φ (provided that the magnetic circuit is arranged as to reduce leakage flux to negligible values). In such case ring D is shaped as to concentrate φ into a smaller area at the cross-section coplanar with sensor H2. In this way the B value measured by H2, B2=φ/S2, is larger than the one measured by H1, B1=φ/S1. For a series configuration it will hence be:

$$Vh1/Vh2=const*B1/B2=const*S2/S1 \quad (6)$$

Therefore, also in this case the ratio Vh1/Vh2 is a function of geometric relationships only. By properly machining ring D, so that the ratio S2/S1 is a suitable function of angular position, it is then possible to obtain the desired form for the output function.

FIG. 1*d* depicts one more example of series configuration, whereby ring D features a C shaped cross-section, whose parameters vary along the circumference as to obtain a S2/S1 ratio with the desired dependency from angular position.

Demonstrated that Vh1/Vh2 can be made to be function of geometric parameters only, through the ratio B1/B2=R2 S2/R1 S1 for the parallel configuration, and the ratio B1/B2=S1/S2 for the series configuration, in the following we will more simply refer to the "B1/B2 Ratio", making it implicit that it will always be possible to identify a geometric configuration such that said "B1/B2 Ratio" is a suitable function of the position coordinate to be measured. For some applications, an output signal which is a linear function θ is preferred, and which might take the form of a triangle function, such as the example of FIG. 1*f* (for this example the signal conditioning electronics generate an output signal linearly varying between 1V and 3V), or a of a saw tooth function. For some other applications, an output signal which is a sinus function of θ could instead be preferred. Each particular choice for the form of the output function has its own set of advantages and drawbacks, and which are already well known. Those skilled in the art would then choose the type of function that best suits a particular application.

It can additionally be remarked that choosing functions of the sinus or triangle form implies that the output signal at angle θ would be identical to the value of the output signal at θ+180°. To resolve such ambiguity a second magnetic circuit could be located 90° further along ring D.

In this way, for the applications requiring a triangle function output a second 90° phase shifted triangle signal would be available. For the applications requiring an output sine function, the 90° phase shifted signal would coincide with a cosine function, so that industry standard SIN-COS type of output signals can be obtained.

Figure 2B:
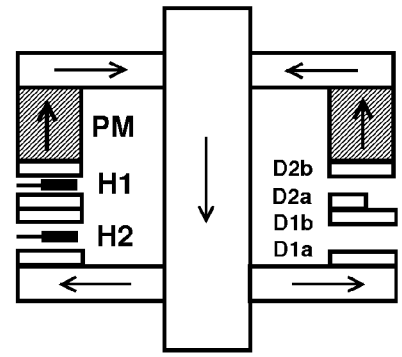

For the magnetic circuit configurations depicted in FIGS. 1*a* to 1*d*, the only moving part is ring D, whereas the permanent magnet and the Hall probes are held in fixed positions. It is also possible to devise configurations characterised in that only the Hall probes are held in fixed positions, while the permanent magnet and the magnetic circuit are all part of a rotating assembly. An example of said rotating assembly is shown in FIG. 2*a*, depicting a perspective view of a cross-section (non-magnetic spacers utilised to fix the two central rings to the shaft are omitted for clarity), and for which FIG. 2*b* schematically represents the same cross-section. PM is an axially magnetised ring magnet, and D1*a* to D2*b* four rings of ferromagnetic material whose geometric parameters vary along the circumference. The magnetic circuit is then closed via the central shaft, also made of ferromagnetic material (alternatively, the magnetic circuit may also be closed via a tube, made of ferromagnetic material, surrounding said shaft). Said rings of ferromagnetic material are then arranged as to obtain a "B1/B2 Ratio" function of the angular position θ. Also for this type of rotating magnetic assembly solution the present invention is not concerned with the particular shapes that rings D1*a* to D2*b* might take, as several different shapes may exist, but that all yield the same form for the output function. It is for example possible to held constant the geometry of the airgap defined by D1*a* and D1*b* (or D2*a* and D2*b*), and vary the geometry of the other airgap, defined by D2*a* and D2*b* (or D1*a* and D1*b*), in a suitable way as to obtain a "B1/B2 Ratio" corresponding to the desired function of θ.

Alternatively, it is also possible to obtain the desired dependence on θ, of the "B1/B2 Ratio", by varying in suitable ways the geometry of both airgaps, instead of just one.

Figure 2C:
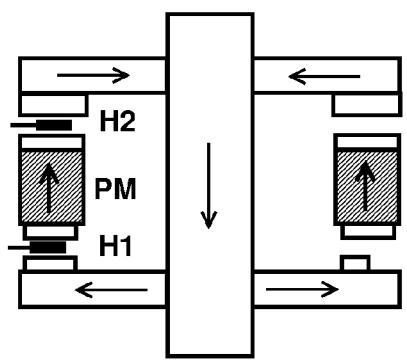
FIGS. 2c, 2d, 2e, and 2f illustrate different possible positions for locating the permanent magnet in various rotary magnetic circuit embodiments.

FIG. 2*c* depicts a configuration similar to the one of FIG. 2*b*, but where the two circular airgaps are located on opposite sides of the ring magnet.

Figure 2D:
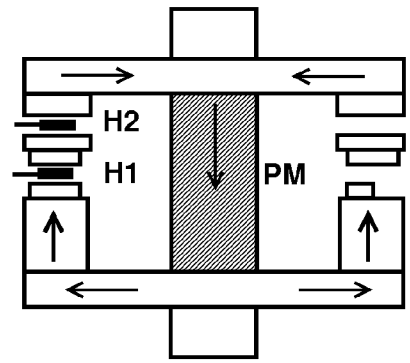

For the configuration of FIG. 2*d* the permanent magnet is instead a cylindrical bar placed along the central shaft. Said bar may also be of a hollow type, surrounding a central shaft made of a material, which, in such case, would not be ferromagnetic.

Figure 2E:
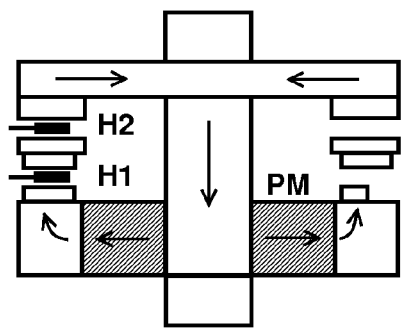
Figure 2F:
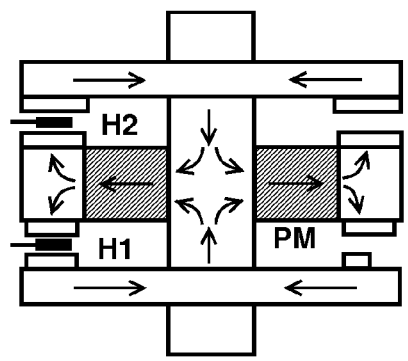

FIGS. 2*e* and 2*f* depict configurations characterised in that the permanent magnet is magnetised along the radial direction.

All of the magnetic circuit configurations described above refer to the measurement of angular positions. For those skilled in the art it is a trivial task to convert said configurations to the measurement of linear positions: just ideally cut all of the ring shaped components along one radius and ideally straighten them. The resulting straighten configurations are then suitable for the measurement of linear displacements.

In order to obtain an electrical signal proportional to the "B1/B2 Ratio" it is then necessary to implement some sort of electronic signal processing. FIG. 3*a* schematically represents an example of signal processing chain:

H1 and H2 are two linear Hall effect probes, such as for example Infineon's KSY14.

S is used to serially supply H1 and H2 with the same biasing current, Ib, and hence preference would be given to a current source, although a stable voltage source would also be suitable (as variations in biasing current are automatically compensated for when computing the ratio Vh1/Vh2 of the two signals).

SC represents a Signal Conditioning network, for example of the passive or active types as usually suggested in the applications notes of the sensor manufacturers, and which is necessary in order to compensate for the inherent offset voltage of the Hall probes, as well as to calibrate for any residual mismatch of their respective sensitivities.

The generated Hall voltages, Vh1 and Vh2, are then fed to a divider circuit, which might be chosen among the many well-known analogue or digital types, to finally generate an output signal proportional to the "B1/B2 Ratio".

FIG. 3*b* schematically depicts a signal processing chain suitable for magnetoresistive bridge type of sensors (MR1 and MR2). For most commercially available magnetoresistive bridges, the output signals, Vm1 and Vm2, are proportional to the supply voltage, rather than to the biasing current. Hence, in such case S would be a voltage source, used to parallel supply both magnetoresistive bridges.

It shall now be remarked that Hall effect and magnetoresistive sensors have recently become commercially available that include said Signal Conditioning circuitry, SC, co-packaged with the sensor itself. In particular, referring to integrated sensors of the Hall effect type, the integrated signal conditioning is usually arranged as to generate an output signal that is proportional to the supply voltage (examples are Infineon's TLE499x type of ratiometric linear Hall sensors), rather than to the supply current. Said type of ratiometric linear Hall sensors would therefore need to be parallel supplied, in the same way as already indicated in FIG. 3*b* for magnetoresistive bridge type of sensors.

The signal conditioning chains schematically represented in FIGS. 3*a* and 3*b* both make use of a divider circuit to generate an output voltage proportional to the "B1/B2 Ratio".

Said divider circuit can be implemented using any of the commercially available divider integrated circuits, or it can also be implemented by means of digital techniques, such as for example a conventional microcontroller implementing an analogue to digital conversion followed by the actual computation of the ratio between the two digital values so obtained. In case required by the application, the digital quotient obtained could then be converted back to the analog domain by means of digital to analog conversion.

Alternatively, a simpler and very convenient way to generate such an output voltage is schematically represented in FIG. 3c:

A feedback loop compares the output of one of the sensor, for example Vh2, with a reference voltage Vref;

The error voltage, Vref-Vh2, is then used to proportionally regulate the voltage controlled source S (whether it be of a current or voltage source type), aiming to obtain a steady state condition characterised in that Vref=Vh2, and resulting hence in a steady state value for the biasing current defined by Ib=Vref/(Kh2*B2)

Hence, thanks to said feedback loop, the output of the other sensor, $v_o$, will directly yield a voltage proportional to the "B1/B2 Ratio":

$$v_o = Kh1/Kh2 * Vref * B1/B2 = Vref * B1/N2 \quad (7)$$

Note that Kh1/Kh2=1 (as assumed in FIG. 3c) only for the ideal case of sensors with matched, or calibrated, sensitivities. Incidentally, equation 7 suggests that by adjusting Vref, for example during factory calibration, it is possible to finely calibrate against any inherent mismatch between the sensitivities of the two sensors, while defining at the same time the overall gain of the sensor. The feedback loop depicted in FIG. 3c, whereby the two Hall probes are connected in series, is ideally suited for simple linear Hall effect probes, such as for example the KSY14 from Infineon.

The feedback loop depicted in FIG. 3d, whereby the two sensors are connected in parallel, is instead better suited for magnetoresistive bridge sensors as well as for ratiometric linear Hall sensors, such as for example the already mentioned Infineon's TLE499x types.

With reference to the sensor configurations described above, it can be remarked that from a manufacturing point of view it turns out very convenient to design the geometries of the two airgaps in such a way that:

One of the two airgaps is designed to result in a B value reproducing the desired function of angular position, and which we will call Variable Airgap.

The other airgap is designed to result in a B value as uniform as possible along the circumference spanning the required range of angular positions, and which we will call Reference Airgap.

Referring to FIGS. 3c and 3d, best accuracy can be achieved when sensor H2 (or MR2) is placed in the Reference Airgap, whereas sensor H1 (or MR1) is placed in the Variable Airgap. For output functions symmetrical with respect to 180°, such as for example triangle or sinus functions, the mechanical design can further be simplified by suppressing the Reference Airgap, and replacing it with a Virtual Reference Airgap built as follows:

the magnetic field sensor that was located in the Reference Airgap is now moved to the Variable Airgap, but at a position diametrically opposed (i.e.:180°) to the other sensor.

The mean of the B values measured by the two sensors, (B1+B2)/2, is a constant independent from angular position, which can then be used as a Virtual Reference Airgap functionally equivalent to the former Reference Airgap.

FIG. 3e depicts a signal conditioning and processing circuitry suitable for the Virtual Reference Airgap approach. A signal proportional to the magnetic field measured in the Virtual Reference Airgap, Bvirtual, is obtained by adding, and then dividing by two, the signals from the two magnetic field sensors, now located in the same airgap, at diametrically opposed angular positions. The skill in the art would typically realise such (Vh1+Vh2)/2 function by means of an operational amplifier in a conventional adder configuration. As in FIG. 3c (3d), the feedback loop will then react to held (Vh1+Vh2)/2 (i.e.: Bvirtual) at a constant value determined by Vref. Similar considerations apply when using magnetic field probes ratiometric with respect to the supply voltage, in which case H1 and H2 will be supplied in parallel rather than in series (as it was instead the case for FIG. 3e).

For all purposes of compensating against temperature and aging drifts of magnet and magnetic field sensors characteristics, such a feedback loop built around the Virtual Reference Airgap is as effective as one built around a Reference Airgap.

It shall now be reminded that the just described Virtual Reference Airgap approach, being applicable to output functions symmetrical with respect to 180° (examples are sinusoidal and symmetric triangular functions), whenever it is necessary to resolve the already described—180° to 0° and 0° to +180° ambiguity requires a third magnetic field probe, H3, located at a third angular position (typically 90°) with respect to H1 and H2. Alternatively, for a most accurate compensation, said third magnetic field probe could be replaced by a second couple of diametrically opposed probes. Of course, for proper compensation also sensor H3 will need to be supplied by the same supply current as H1 and H2, and in FIG. 3e it will hence appear connected in series to both them (or in parallel for magnetic field probes ratiometric to the supply voltage). If a second couple of diametrically opposed probes is instead used, then it can be supplied in the same way but on its own, independently from the supply of the first couple of probes.

It is considered a trivial task to adapt the airgap configurations depicted in FIGS. 2b through 2f to the Virtual Reference Airgap approach: just suppress one of the two airgaps, and move the corresponding magnetic field sensor to the other airgap, at an angular position diametrically opposed to the position of the other sensor.

Figure 4A:
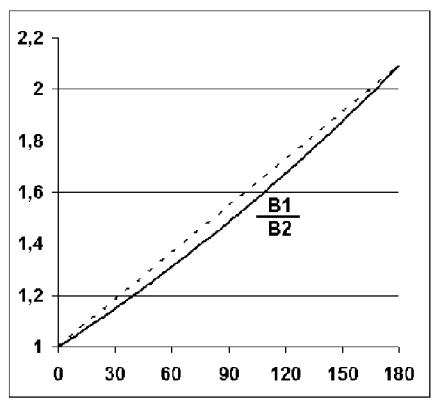
FIG. 4a illustrates the deviation from linearity of the magnetoresistive voltage divider approach.

For those applications where accuracy can be sacrificed in favour of simplicity of design, and hence reliability, the extremely simple circuit shown in FIG. 3f represents an interesting alternative. R(B1) and R(B2) are two simple magnetoresistors (functions of B) connected as a resistive divider. The output voltage is hence $$v_o = V/(1 = R(B1)/R(B2)) \quad (8)$$

which is NOT a linear function of the "B1/B2 Ratio", especially when taking into account also the strongly non-linear form of R(B) as a function of B. However, by a suitable choice of the geometric parameters defining the form of said "B1/B2 Ratio", even in this case it is possible to largely compensate for such non linearities. An example is shown in FIG. 4a, whereby the "B1/B2 Ratio" is purposely designed to be a non-linear function of the angular displacement (between 0 and 180 degrees in FIG. 4a), and whose deviation from linearity can be judged by comparing the B1/B2 curve with the ideally linear behaviour (the dotted line) shown for reference only.

Figure 4B:
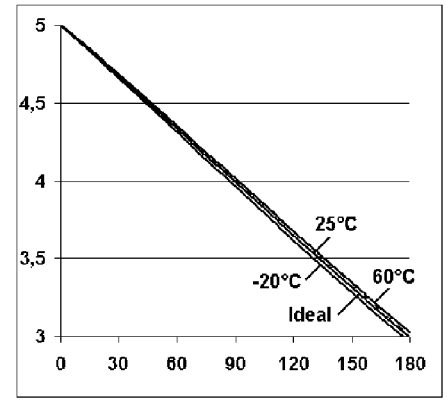
FIG. 4b summarizes the performances of an application example of the magnetoresistive voltage divider approach.

FIG. 4b shows an application example with two N-type magnetoresistors from Siemens, utilised in the range 0.3 T to 0.6 T, demonstrating how such a simple resistive divider circuit can nevertheless directly generate an output voltage linearly decreasing from 5V to 3V (or, for the symmetric case, linearly increasing from 3V to 5V), while maintaining the maximum deviation from linearity to within −0.4% to +0.1% @ 25° C., 0% to +0.6% @ 60° C., −1% to +0% @−20° C.

Figure 4C:
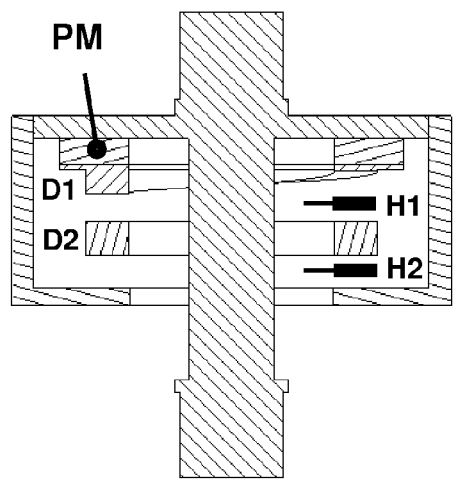
FIGS. 4c and 4d present a section and a perspective view of a rotary magnetic circuit embodiment, whereby the variable field sensed by the probes extends coaxially to the shaft main axis.
Figure 4D:
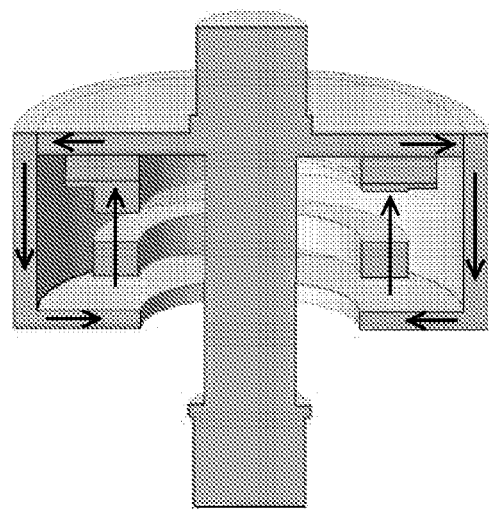
Figure 4E:
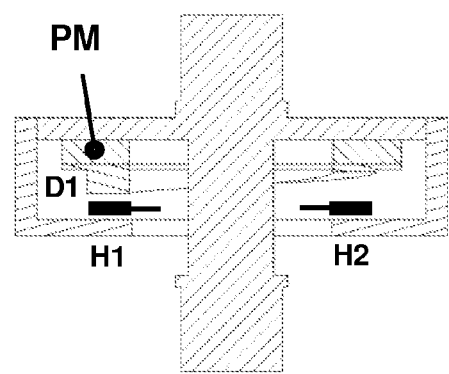
FIGS. 4e and 4f present a section and a perspective view of a rotary magnetic circuit embodiment, whereby the variable field sensed by the probes extends coaxially to the shaft main axis, and it is shaped in such a way that the Virtual Reference Airgap approach can be applied.
Figure 4F:
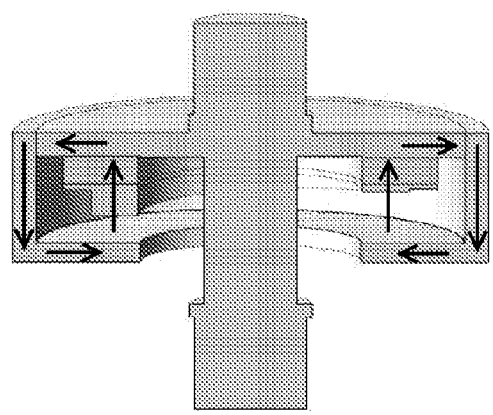

For all the sensor configurations depicted in FIGS. 2a through 2f most of the magnetic flux generated by the permanent magnet is closed radially through the shaft (the arrows describe the main path followed by the magnetic flux, leakage paths are not represented). There are however instances where it is instead desirable to have most of the magnetic flux closing radially through an external cylindrical path, rather than through the shaft. Examples are those applications requiring a hollow shaft so that too small a cross-section would be available for closing the flux without magnetic saturation effects, or applications where it is desirable to better screen the magnetic field probes against the presence of magnetic fields external to the sensor. FIG. 4c represents a cross-section (to aid understanding, FIG. 4d depicts a perspective view of the same section) of an example of just such a configuration, and which is equivalent to that of FIG. 2a, the difference being that now the magnetic flux is closed through the external cylindrical wall, and that the Variable Airgap is obtained by varying the thickness of ring D1, rather than the width of D2a as it was the case in FIG. 2a. Ring D2 serves the purpose to render as uniform as possible the magnetic field measured by H2 (or MR2) in the Reference Airgap. All the parts of this rotary magnetic circuit are fixed relatively to the central shaft (a non magnetic spacer fixing D2 to the shaft is omitted for clarity). FIGS. 4e and 4f depict the same configuration as in FIGS. 4c and 4d, but after suppressing the Reference Airgap, and relocating H2 to the Variable Airgap at an angular position diametrically opposed to H1. The Reference Airgap is then replaced by the Virtual Reference Airgap, built by taking the mean value of the B values measured by H1 and H2. For clarity, FIG. 4e does not show the third magnetic field probe (or alternatively the second couple of probes) used to resolve the −180° to 0° and 0° to +180° ambiguity.

Figure 5A:
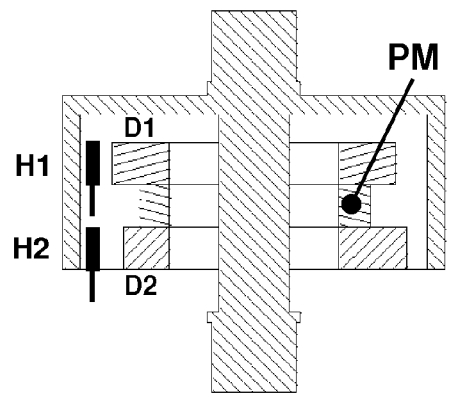
FIGS. 5a and 5b present a section and a perspective view of a rotary magnetic circuit embodiment, whereby the variable field sensed by the probes extends radially with respect to the shaft.
Figure 5B:
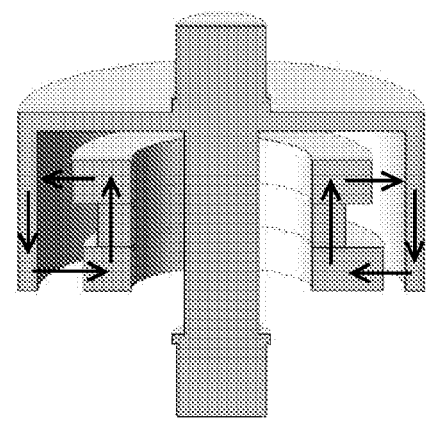
Figure 5C:
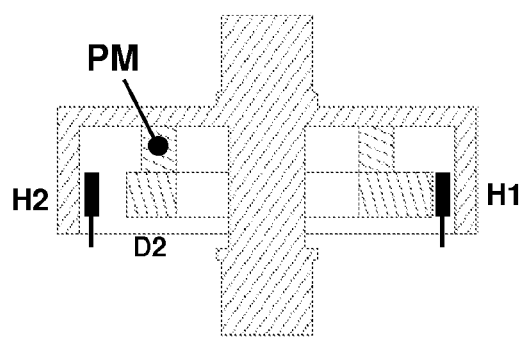
FIGS. 5c and 5d present a section and a perspective view of a rotary magnetic circuit embodiment, whereby the variable field sensed by the probes extends radially with respect to the shaft, and it is shaped in such a way that the Virtual Reference Airgap approach can be applied.
Figure 5D:
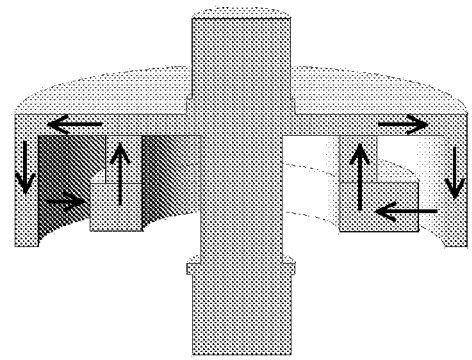

FIGS. 5a and 5b describe a configuration convenient for those applications where it might be desirable to mount the magnetic field probes parallel to the central shaft, rather than perpendicularly to it. H1 is located in the Reference Airgap, whereas H2 is located in a Variable Airgap obtained by varying the radial width of ring D2 as a function of angular position. The Virtual Reference Airgap version of this last configuration is depicted in FIGS. 5c and 5d. For clarity, FIG. 5c does not show the third magnetic field probe (or alternatively the second couple of probes) used to resolve the −180° to 0° and 0° to +180° ambiguity.

Concerning the parallel magnetic circuit configuration of FIG. 1b, for some applications it might be convenient to adopt a geometry such that the magnetic field probes H1 and H2 are located in airgaps of constant geometry, as to minimise crosstalk effects and non-linearities resulting from leakage flux and border effects whose impact would otherwise also vary with position. The task of varying the overall reluctance of a parallel branch of the magnetic circuit is then transferred to a third airgap of variable geometry, which can now be optimised free from the constraints imposed by the need to reserve some space for mounting a magnetic field probe. FIG. 1e schematically represents such an approach, whereby the airgaps surrounding H1 and H2 are now of a constant geometry, while the task of varying the reluctance of the parallel branch crossed by flux φ2, is now delegated to a specialised variable airgap, $V_{gap}$, whose geometry is designed to vary with position in such a way the "B1/B2 Ratio" corresponds to the desired function of position.

Figure 5E:
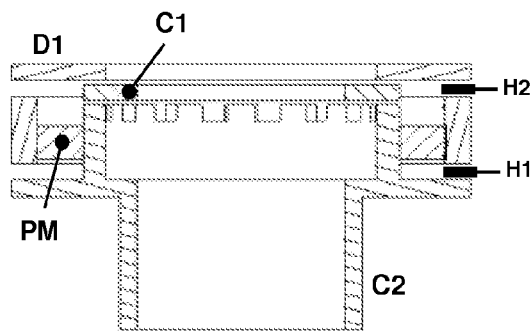
FIGS. 5e and 5f present a section and a perspective view of a rotary magnetic circuit embodiment allowing the measurement of the relative angular displacement of two rotating parts.
Figure 5F:
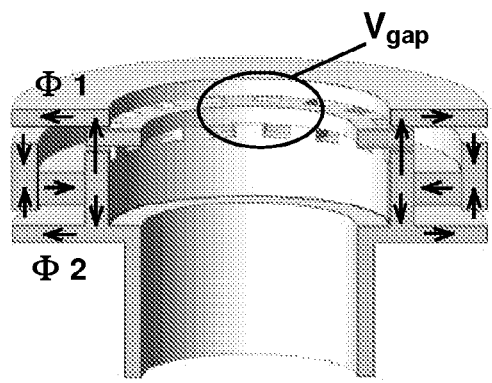

An interesting application of such an approach is the measurement of small relative angular displacements of two rotating elements, such as for example in torque sensors. A very common way to measure torque consists in measuring the relative angular displacement of two shafts coaxially connected by a torsion bar. FIG. 5e depicts the cross section of a rotary magnetic circuit configuration optimised for just this type of measurements, while FIG. 5f illustrates its perspective view, which helps in understanding the radial paths followed by the magnetic flux generated by the permanent magnet. The principle of operation is as follows:

the permanent magnet, PM, is radially magnetised, and it generates a magnetic flux that then splits into two parallel branches: φ1 and φ2;

the variable gap, $V_{gap}$, of FIG. 1e is in this case of a circular design, and it is realised by means of a crown, C1, featuring a plurality of teeth, and which can rotate relatively to the corresponding teeth machined on part C2, so that a small relative angular displacement between C1 and C2 will result in a variation of the overall reluctance of the parallel branch crossed by φ1;

all parts, except C1, are fixed to C2 by means of suitable non-magnetic spacers (not shown for clarity), and they will hence rotate together with C2, this in order to minimise effects resulting from eddy currents which would be induced at high speed operation, but it otherwise does not need to be so for low speed applications;

ring D1 closes the path for flux φ1 making also sure that the B value measured by H2 is as uniform as possible along the corresponding circumference, as it is the case for the B value measured by H1;

H1 and H2 are not rotating, but they are fixed to the external printed circuit board featuring the signal conditioning and processing electronics;

when C1 and C2 both rotate at the same angular rate, and without any relative angular displacement, then the "B1/B2 Ratio" will correspond to a well defined value, independent from the absolute angular position along the full 360° arc;

when C1 and C2 still rotate at the same angular rate, but now with some amount of relative angular displacement, then the "B1/B2 Ratio" will still correspond to a well defined value, which will still be independent from the absolute angular position along the full 360° arc, but now such well defined value will be different from the one measured at zero relative angular displacement;

for torque measurement applications crown C1 would typically be coupled to a first shaft, while C2 to a second shaft coaxial with the first one, and said two shafts will then be coupled by means of a torsion bar calibrated to yield a relative angular displacement (just few degrees, typically) function of the applied torque.

The inventive step of this invention shall be understood as independent from any detailed choice of the geometry defining the form of the "B1/B2 Ratio" function, rather it consists in the more general idea of arranging the geometry of a magnetic circuit in such a way that the measurement of angular (or linear) displacements can be carried out by computing the ratio between magnetic field values measured at two different locations, making it hence largely independent from variations in temperature or from drifts in the working point of the permanent magnet.

It shall be appreciated that those skilled in the art, building on the features of the invention described above, now could

The invention claimed is:

1. A method of measuring angular positions based on a magnetic principle of operation, and featuring self-compensation against unwanted deviations of the measurement's output value from a predetermined function of angular position, comprising:
   a. providing a rotor part containing a rotary magnetic circuit, the magnetic flux through which is generated by a permanent magnet, featuring one or more circular air gaps coaxial with respect to the rotor main rotational axis, the geometry, when referring to a cylindrical coordinate system whose z axis coincides with the rotor main rotational axis, of said circular air gaps being purposely designed with widths which are predetermined functions of azimuth $\phi$, such that the mathematical form of the resulting functions which describe the value of the magnetic field $B(\phi)$ along circles contained within said air gaps, said circles being further centred on and perpendicular to the z axis, possess such a rotational symmetry that there exist pairs of fixed locations characterised by pairs of magnetic field values, B1 and B2, having the property that the sum B1+B2 is substantially a constant value, and thereby also independent of the value of the angle of rotation $\theta$ of the rotor with respect to said fixed locations,
   b. providing a plurality of magnetic field probes arranged in pairs for measuring the corresponding pairs of magnetic field values heretofore, the two probes of each pair possessing substantially the same electrical characteristics and belonging either to the known type whose output signal is ratiometric with respect to the supply voltage or to the known type whose output signal is ratiometric with respect to the supply current,
   d. providing means for coupling the rotor part to the rotary members whose angular position is the ultimate objective of the measurement, while ensuring that the rotor main rotational axis is substantially coaxial, given some unavoidable mechanical tolerances and mounting inaccuracies, with respect to the rotational axis of said rotary members,
   e. providing, for each of said pairs of magnetic field probes, a signal conditioning and processing electronics realising a compensating feedback loop which will:
      obtain a signal $V_{mean}$ proportional to the arithmetical mean $(V_{h1}+V_{h2})/2$ of the output signals, $V_{h1}$ and $V_{h2}$, generated by the magnetic field probes belonging to a same pair, and
      subtract said $V_{mean}$ value from a constant reference value $V_{ref}$, as to obtain a so called error signal, and
      control said pair of probes' common supply proportionally to the value of said error signal through a gain factor of sufficiently large value that an equilibrium working point is obtained which for all practical purposes corresponds to the condition $V_{mean}=V_{ref}$ being substantially satisfied,
   whereby drifts and deviations from nominal values of those parameters whose variations would otherwise result, in case the compensating feedback loop heretofore were not implemented, in unwanted deviations of the $V_{h1}(\theta)$ or $V_{h2}(\theta)$ output signal values from their respective predetermined functions of $\theta$, and consequently also in corresponding deviations from an otherwise constant value of the $V_{mean}$ value heretofore, will now urge a reaction of the feedback loop resulting in said magnetic field probes' output signal values, $V_{ref}B1(\theta)/B_{virtual}$ and $V_{ref}B2(\theta)/B_{virtual}$, being inherently compensated and hence independent of the values of those components of said drifts and deviations from nominal values which affect in the same proportional manner both the numerator and the denominator, said feedback loop reaction having acted to adjust in the same proportional manner the individual gains of the two probes by modifying their common supply, thereby transferring the effects of the drifts and deviations heretofore from said probes' output signal values to the otherwise predetermined constant value of said common supply, value of common supply which thereby naturally contains useful diagnostic information about the nature and extent of said drifts and deviations from nominal values.

2. The method of claim 1 wherein only one pair of probes is needed and said rotor part has a first central shaft and a second central shaft which are coaxially coupled by means of a torsion bar, the rotary magnetic circuit heretofore being constructed so that the predetermined value of the magnetic flux $\Phi$ generated by a coaxial ring shaped permanent magnet, PM, is split into two portions, $\Phi_1$ and $\Phi_2$, each embracing one of two parallel branches, and thereby ensuring that the condition $\Phi=\Phi_1+\Phi_2$ is substantially verified, made of ferromagnetic parts and characterised in that the first branch features a first circular air gap of uniform cross-section whereas the second branch features a second circular air gap of uniform cross-section serially connected to a third circular air gap, $V_{gap}$, whose reluctance is a predetermined function of the relative angle of rotation $\theta$, as limited by the characteristics of said torsion bar, between said first and second shaft, resulting in magnetic field values in the two uniform circular air gaps heretofore which are predetermined functions of $\theta$, $B1(\theta)$ and $B2(\theta)$, but which are independent of azimuth $\phi$, and whose sum $B1(\theta)+B2(\theta)$ is substantially a constant value, independent of the value of $\theta$ as a result of the condition $\Phi=\Phi_1+\Phi_2$ being substantially verified.

3. The method of claim 1 wherein said rotor part has a central shaft, either of a solid or of a hollow type, coaxial with the rotor main rotational axis and from which a first disk of ferromagnetic material extends up to a certain predetermined radial distance, the rotary magnetic circuit heretofore being then constructed by adding contiguous to one side of said disk a coaxial ring shaped permanent magnet, PM, which is axially magnetised and whose external diameter is predetermined to be less than the external diameter of said first disk, further providing a coaxial tubular yoke, made of ferromagnetic material and with it first edge contiguous to the external edge of said first disk, extending parallel to the z direction on the same side as the permanent magnet, adding then a second, annulus shaped, disk of ferromagnetic material extending from the second edge of said tubular yoke towards the central shaft, and up to a radial distance larger than the external radius of said central shaft, and further adding a coaxial ring of ferromagnetic material, D1, contiguous to said permanent magnet and whose thickness parallel to z is a predetermined function of azimuth $\phi$, thereby obtaining in between said coaxial ring D1 and said second disk a circular air gap characterised by a magnetic field $B(\phi)$ substantially directed parallel to z.

4. The method of claim 3 wherein the predetermined mathematical form of the function $B(\phi)$ heretofore possess a rotational symmetry defined by $B(\phi)+B(\phi+180°)$=constant independent of $\phi$, so that each of the pairs of probes heretofore consists of two diametrically opposed probes, H1 and H2.

5. The method of claim 4 wherein the number of pair of probes is limited to one.

6. The method of claim 4 wherein the number of pair of probes is limited to two, one pair located at 90° azimuth from the other.

7. The method of claim 1 wherein said rotor part has a central shaft, either of a solid or of a hollow type, coaxial with the rotor main rotational axis and from which a disk of ferromagnetic material extends up to a certain predetermined radial distance, the rotary magnetic circuit heretofore being then constructed by adding contiguous to one side of said disk a coaxial ring shaped permanent magnet, PM, which is axially magnetised and whose external diameter is predetermined to be less than the external diameter of said disk, further providing a coaxial tubular yoke, made of ferromagnetic material and with it first edge contiguous to the external edge of said disk, extending parallel to the z direction on the same side as the permanent magnet, adding then a coaxial ring of ferromagnetic material, D2, contiguous to said permanent magnet and characterised by a radial profile, $r(\phi)$, of its external edge which is a predetermined function of azimuth, thereby obtaining in between said coaxial ring D2 and said tubular yoke a circular air gap characterised by a magnetic field $B(\phi)$ substantially radial.

8. The method of claim 7 wherein the predetermined mathematical form of the function $B(\phi)$ heretofore possess a rotational symmetry defined by $B(\phi)+B(\phi+180°)=$constant independent of $\phi$, so that each of the pairs of probes heretofore consists of two diametrically opposed probes, H1 and H2.

9. The method of claim 8 wherein the number of pair of probes is limited to one.

10. The method of claim 8 wherein the number of pair of probes is limited to two, one pair located at 90° azimuth from the other.

11. The method of claim 1 wherein said rotor part has a central shaft, either of a solid or of a hollow type, coaxial with the rotor main rotational axis and from which a disk of ferromagnetic material extends up to a certain predetermined radial distance, the rotary magnetic circuit heretofore being then constructed by adding contiguous to one side of said disk a coaxial ring shaped permanent magnet, PM, which is axially magnetised and whose external diameter is predetermined to be less than the external diameter of said disk, further providing a coaxial tubular yoke, made of ferromagnetic material and with it first edge contiguous to the external edge of said disk, extending parallel to the z direction on the same side as the permanent magnet, adding then a coaxial ring of ferromagnetic material, D2, contiguous to said permanent magnet and characterised by a radial profile, $r(\phi)$, of its external edge which is a predetermined function of azimuth, thereby obtaining in between said coaxial ring D2 and said tubular yoke a circular air gap characterised by a magnetic field $B(\phi)$ substantially radial.

12. The method of claim 11 wherein the predetermined mathematical form of the function $B(\phi)$ heretofore possess a rotational symmetry defined by $B(\phi)+B(\phi+180°)=$constant independent of $\phi$, so that each of the resistive divider configurations heretofore consists of two diametrically opposed magnetoresitive probes.

13. The method of claim 12 wherein the number of pair of probes is limited to one.

14. The method of claim 12 wherein the number of pair of probes is limited to two, one pair located at 90° azimuth from the other.

15. A method of measuring angular positions based on a magnetic principle of operation, and featuring self-compensation against unwanted deviations of the measurement's output value from a predetermined function of angular position, comprising:

a. providing a rotor part containing a rotary magnetic circuit, the magnetic flux through which is generated by a permanent magnet, featuring one or more circular air gaps coaxial with respect to the rotor main rotational axis, the geometry, when referring to a cylindrical coordinate system whose z axis coincides with the rotor main rotational axis, of said circular air gaps being purposely designed with widths which are predetermined functions of azimuth $\phi$, such that the mathematical form of the resulting functions which describe the value of the magnetic field $B(\phi)$ along circles contained within said air gaps, said circles being further centred on and perpendicular to the z axis, possess such a rotational symmetry that there exist pairs of fixed locations characterised by pairs of magnetic field values, B1 and B2, having the property that the sum B1+B2 is substantially a constant value, and thereby also independent of the value of the angle of rotation $\theta$ of the rotor with respect to said fixed locations, b. providing a plurality of magnetoresitive probes arranged in pairs for measuring the corresponding pairs of magnetic field values heretofore, the two probes of each pair possessing substantially the same electrical characteristics and being serially connected in a conventional resistive divider configuration, d. providing means for coupling the rotor part to the rotary members whose angular position is the ultimate objective of the measurement, while ensuring that the rotor main rotational axis is substantially coaxial, given some unavoidable mechanical tolerances and mounting inaccuracies, with respect to the rotational axis of said rotary members, whereby the output voltage of each of the resistive divider configurations heretofore, being proportional to $R(B2)/[R(B1)+R(B2)]$, and where $R(B1)+R(B2)$ is substantially a constant value independent of the value of the angle of rotation $\theta$, is inherently compensated and hence independent of the values of those components of drifts and deviations from nominal values which affect in the same proportional manner both the numerator and the denominator.

16. The method of claim 1 wherein only one pair of probes is needed and said rotor part has a first central shaft and a second central shaft which are coaxially coupled by means of a torsion bar, the rotary magnetic circuit heretofore being constructed so that the predetermined value of the magnetic flux $\Phi$ generated by a coaxial ring shaped permanent magnet, PM, is split into two portions, $\Phi_1$ and $\Phi_2$, each embracing one of two parallel branches thereby ensuring that the condition $\Phi=\Phi_1+\Phi_2$ is substantially verified, made of ferromagnetic parts and characterised in that the first branch features a first circular air gap of uniform cross-section whereas the second branch features a second circular air gap of uniform cross-section serially connected to a third circular air gap, $V_{gap}$, whose reluctance is a predetermined function of the relative angle of rotation $\theta$, as limited by the characteristics of said torsion bar, between said first and second shaft, resulting in magnetic field values in the two uniform circular air gaps heretofore which are predetermined functions of $\theta$, $B1(\theta)$ and $B2(\theta)$, but which are independent of azimuth $\phi$, and thereby obtaining the result that the output voltage proportional to $R(B2)/[R(B1)+R(B2)]$ is inherently compensated, and hence independent of the values of those components of drifts and deviations from nominal values which affect in the same proportional manner both the numerator and the denominator.

17. The method of claim 15 wherein said rotor part has a central shaft, either of a solid or of a hollow type, coaxial with the rotor main rotational axis and from which a first disk of ferromagnetic material extends up to a certain predetermined radial distance, the rotary magnetic circuit heretofore being then constructed by adding contiguous to one side of said disk a coaxial ring shaped permanent magnet, PM, which is axially magnetised and whose external diameter is predetermined to be less than the external diameter of said first disk, further providing a coaxial tubular yoke, made of ferromagnetic material and with it first edge contiguous to the external edge of said first disk, extending parallel to the z direction on the same side as the permanent magnet, adding then a second, annulus shaped, disk of ferromagnetic material extending from the second edge of said tubular yoke towards the central shaft, and up to a radial distance larger than the external radius of said central shaft, and further adding a coaxial ring of ferromagnetic material, D1, contiguous to said permanent magnet and whose thickness parallel to z is a predetermined function of azimuth $\phi$, thereby obtaining in between said coaxial ring D1 and said second disk a circular air gap characterised by a magnetic field $B(\phi)$ substantially directed parallel to z.

18. The method of claim 17 wherein the predetermined mathematical form of the function $B(\phi)$ heretofore possess a rotational symmetry defined by $B(\phi)+B(\phi+180°)$=constant independent of $\phi$, so that each of the resistive divider configurations heretofore consists of two diametrically opposed magnetoresitive probes.

19. The method of claim 18 wherein the number of pair of probes is limited to one.

20. The method of claim 18 wherein the number of pair of probes is limited to two, one pair located at 90° a zimuth from the other.

* * * * *